United States Patent
Baumberg

[19]

[11] Patent Number: 5,861,914
[45] Date of Patent: Jan. 19, 1999

[54] METHOD AND SYSTEM FOR REPRESENTING INFORMATION DATA WITH DEVIATION OF INTERROGATING ELEMENT FROM FIELD LIMIT AT ANY POINT

[76] Inventor: Iosif Baumberg, 69 Bay 29 St., Brooklyn, N.Y. 11214

[21] Appl. No.: 771,503

[22] Filed: Dec. 23, 1996

[51] Int. Cl.⁶ ............................. H04N 3/28; H04N 5/253
[52] U.S. Cl. ............................................ 348/206; 382/322
[58] Field of Search .................................. 348/96, 97, 98, 348/99, 100, 101, 102, 103, 104, 105, 106, 206; 382/316, 322

[56] References Cited

U.S. PATENT DOCUMENTS

| | | | |
|---|---|---|---|
| 2,904,629 | 9/1959 | Scherbatskoy | 348/206 |
| 3,350,505 | 10/1967 | Bakis | 347/226 |
| 3,711,831 | 1/1973 | Kaneko et al. | 382/322 |
| 3,758,712 | 9/1973 | Hudson | 348/594 |
| 3,958,077 | 5/1976 | Ross et al. | 348/206 |
| 4,011,401 | 3/1977 | Presti | 348/239 |
| 4,625,242 | 11/1986 | Baumberg | 348/206 |
| 4,945,421 | 7/1990 | Baumberg | 348/206 |

*Primary Examiner*—Wendy Garber
*Assistant Examiner*—Ngoc-Yen Vu
*Attorney, Agent, or Firm*—Ilya Zborovsky

[57] ABSTRACT

A system for representing information data has a scanning device for scanning information data and including a unit for interrogating the information data and formed as a movable interrogating element unit for forming a main flow of impulses corresponding to the information data which have been interrogated by the interrogating element, a unit for forming commands in response to the impulses for moving the interrogating element successively in direction selected from more than two directions with equal probability, a unit for providing deviation of the interrogating element by a limit of a field, and a unit located downstream of the deviation unit for introducing an additional flow of impulses randomly distributed in time, so that the interrogating element can move in response to the impulses of the additional flow and deviate also at any point of the field.

2 Claims, 3 Drawing Sheets

METHOD AND SYSTEM FOR REPRESENTING INFORMATION DATA WITH DEVIATION OF INTERROGATING ELEMENT FROM FIELD LIMIT AT ANY POINT

BACKGROUND OF THE INVENTION

The present invention relates to a method and system of a representing information data, particularly those involving scanning of information data.

Methods and systems of the above mentioned type are widely known and used for example in television, radiolocation, roentgenography, radioisotope analysis, storage tube of computer memory, etc. Scanning of the respective data is here performed for respective use.

In accordance with a method and system disclosed my U.S. Pat. No. 4,625,242, an interrogating element interrogates information data and a flow of impulses is produced in correspondence with the interrogated data, and the interrogating element moves successively in directions selected in response to commands formed in response to the impulses, from more than two directions with an equal probability. This provides for dependence between the tightness of scanning lines, the area of the pictured element, and the quantity of the information in the area of the pictured element, and the quantity of the information in the transmitted image, which leads to significant increase of resolving power. Flickering is eliminated. It is no longer necessary to return the interrogating element after each line to the beginning of the next line. The quality of images is improved.

In accordance with the proposal disclosed in my U.S. Pat. No. 4,945,421, when the interrogating element reaches a limit of an information field, it is moved back into the information field in a jump-like manner to a random point. This provides additional advantages in that a time of scanning near the field limits is the same as in the central area of the field, the density of lines of scanning does not depend on the value of the video signal scanned from the respective portion of the image, it is possible to regulate the average density of lines of scanning, and all together the quality of representing information data is improved. In accordance with the method and system disclosed in both above mentioned patents, $\sqrt{\sqrt{2}}$ times more elements of image are scanned than in the prior art methods and systems when the interrogating element moves along the lines and then between the lines.

The methods and systems disclosed in the above mentioned patents can be however further improved. In the method and system disclosed in the U.S. Pat. No. 4,945,421 when the scanning element reaches a left or a right limit of the scanning field a new abscissa is selected while an ordinate remains unchanged, and when an upper or a lower limit is reached a new ordinate is selected while an abscissa remains unchanged. A new sampling or scanning is selected therefore only after the jump of the interrogating element from the limits of the image field. These actions are necessary, however they do not provide the operation of a system in an optimal mode.

SUMMARY OF THE INVENTION

Accordingly, it is an object of the present invention to provide a method and system of representing information data of the above mentioned general type, which are further improvements in the methods and systems disclosed in my above mentioned U.S. patents.

In keeping with these objects and with others which will become apparent hereinafter, one feature of the present invention resides, briefly stated, in a method and system in which in addition to forming a main flow of impulses corresponding to information data which have been interrogated by an interrogating element and moving the interrogating element successively in direction selected in response to the impulses, an additional flow of impulses which are randomly distributed in time is introduced and the interrogating element can also move in response to the impulses of the additional impulse flow.

In accordance with the specific embodiments of the invention, an independent generator of randomly distributed impulses is introduced before a corresponding executing device for moving the interrogating element.

When the method is performed and the system is designed in accordance with the present invention, it avoids the disadvantages of the prior art and provides for the above mentioned highly advantageous results. The interrogating element can move or provide a new sampling or scanning not only when it bounced from the field limit but also at any point of the field as well.

My U.S. Pat. Nos. 4,625,242 and 4,945,421 are incorporated in the present application by way of a reference.

DESCRIPTION OF PREFERRED EMBODIMENTS

Figure 1:
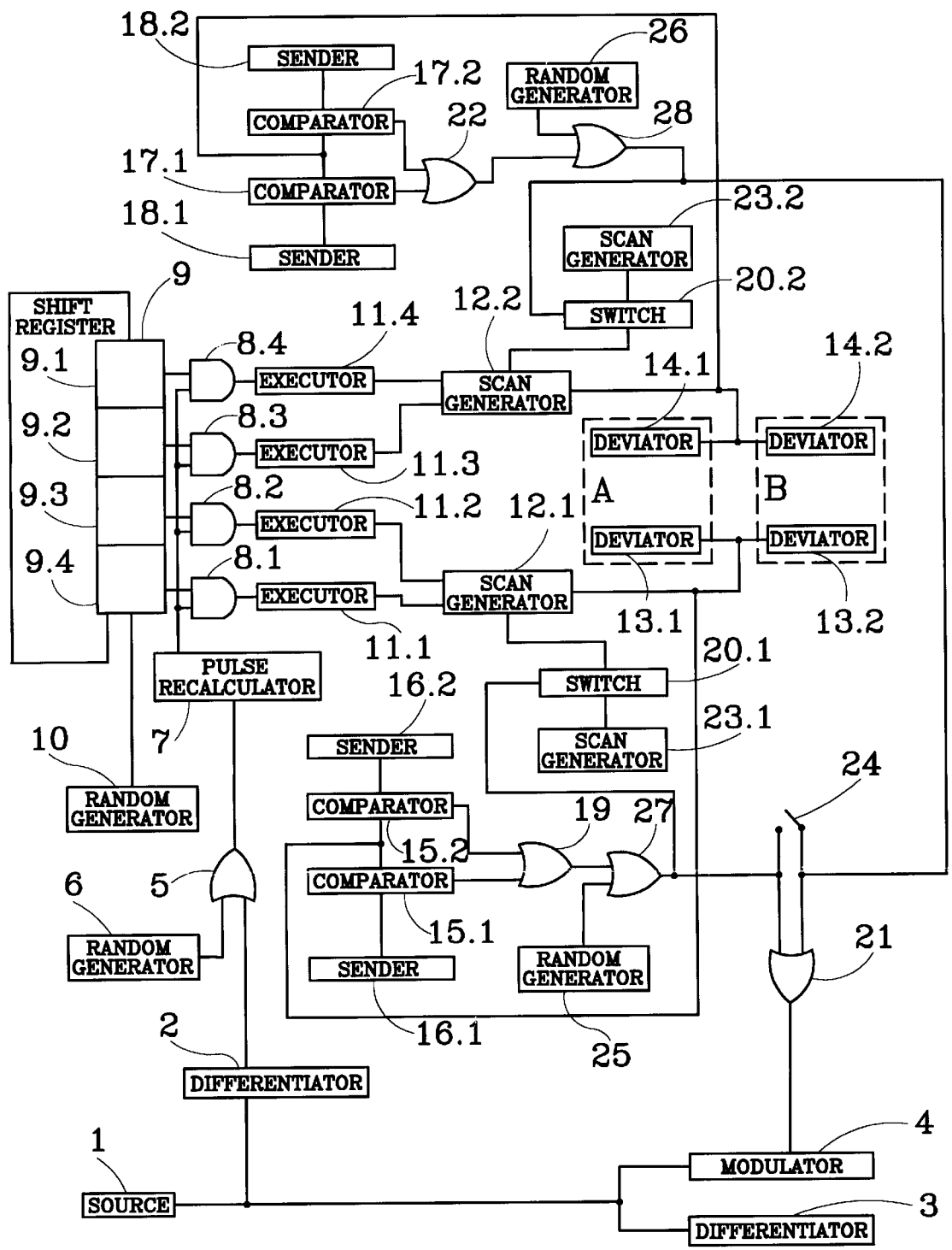
FIG. 1 is a view which schematically shows a system for representing information data, in accordance with the present invention.

Reference numeral 1 identifies a source of information, for example a source of a video signal. The output of the source of information is connected with inputs of a first differentiating unit 2 in a transmitting device, a second differentiating unit 3 and a modulating unit 4 in a receiving device. An output of a first generator of pulses randomly distributed in time 6 is connected with a first input of a logic element "OR" 5, while the output of the second differentiating unit 2 is connected with a second input of the logic element 5. The output of the logic element 5 is connected with an input of a pulse recalculating unit 7. The output of the unit 7 is connected with first inputs of all logic elements "AND" 8.1–8.4. For scanning of two-dimensional images in an orthogonal coordinate system, four elements "AND" are needed.

The second input of each logic element "AND" is connected with an output of a respective call 9.1–9.4 of a shift register 9 with the "1" which is shifted by pulses supplied from the second generator of pulses randomly distributed in time 10. The pulses generated by the generators 6 and 10 can be distributed for example in accordance with Poisson's law.

The output of each logic element "AND" 8.1–8.4 is connected with an output of a respective executing unit 11.1–11.4. The output of one pair 11.1 and 11.3 of the executing units is connected with two inputs of a generator of scanning (sweeping) along an axis of abscissa 12.1. The output of a second pair 11.2 and 11.4 of the executing unit is connected with two inputs of generator of scanning (sweeping) along an axis of ordinate 12.2. The output of the generator 12.1 is connected with deviating units of a horizontal scanning (along the abscissa axis) 13.1 in the transmitting device A for example inconoscope, and 13.2 in the receiving device B for example kinescope. The output of the generator 12.1 is also connected with firsts inputs of two comparing elements 15.1 and 15.2. The output of the generator 12.2 is connected with the deviating systems of a vertical scanning (along the ordinate axis) 14.1 in the transmitting device A and 14.2 in the receiving device B. The output of the generator 12.2 is also connected with first inputs of two comparing elements 17.1 and 17.2.

The second input of the comparing element 15.1 is connected with a sensor of a constant value 16.1 equal to the abscissa of a left border of a rectangular field of image $X_{min}$. The second input of the comparing element 15.2 is connected with a sender of a constant value 16.2 equal to the value of abscissa of the right border of the rectangular field of image $X_{max}$. The equations $X=X_{min}$ and $X=X_{max}$ correspond to the equations of straight lines which determine the left and right borders of the field to be scanned. The second input of the comparing element 17.1 is connected with a sender of constant value 18.1 equal to the value or ordinate of a lower limit of the rectangular scanning field $Y_{min}$. Finally, the second input of the comparing element 17.2 is connected with a sender of constant value of 18.2 equal to the value of ordinate of an upper limit of the rectangular scanning field $Y_{max}$. $Y=Y_{min}$ and $Y=Y_{max}$ are equations of straight lines located along the lower and upper borders of the field to be scanned.

The outputs of the comparing elements 15.1 and 15.2 are connected with inputs of a long element "OR" 19. The output of the latter is connected with a controlling (giving) input of a first normally open switch 20.1 and a first input of a logic element "OR" 21. The outputs of the comparing elements 17.1 and 17.2 are connected with the inputs of a logic elements "OR" 22. The output of the latter is connected with a controlling (giving) input of a second normally open controlled switch 20.2 and with a second input of the logic element "OR" 21. Through the first normally open switch 20.1, during the supplies a pulse to the controlling input of the latter, an auxiliar generator of scanning (sweeping) 23.1 is connected during the time of action of the controlling pulse to the generator of scanning 12.1. Through the second controllable normally open switch 20.2, during supplying of a controllable pulse to the input of the latter, a second auxiliary generator od scanning 23.2 is connected during the time of action of the controlling pulse with the generator of scanning 12.2. The inputs of the logic element "OR" are connected with two outputs of a switch 24.

The system in accordance with the present invention operates in the following manner:

The information which is being read by a source 1 (FIG. 1), for example inconoscope of a transmitting device, is supplied and an information pulse flow $F(\tau)$ with $F(\tau)$ equal to an average statistic frequency of pulses Fb as a function of time t, to the inputs of the differentiating unit 2 in the transmitting device, and the differentiating unit 3 and the modulating unit 4 in the receiving device. From the output of the differentiating unit 2 an absolute value of a derivative of the input signal $[F'(\tau)]$ in a discrete form is supplied to the first input of the logic element "OR"5. The second input of the latter receives from the generator 6 a permanent flow of pulses which are randomly distributed in time and have a constant average statistic frequency of pulses $F_1$, which are distributed for example in accordance with a Poisson law. The pulse flows from the unit 2 $[F'(\tau)]$ and from the generator of pulses $6F_1$ are superimposed in the logic element "OR" 5 and supplied at the output of the latter as a resulting flow $F_3(F_1[F'(\tau)])$. The latter flow contains a sum of the component flows $F_1$ and $[F'(\tau)]$ without the pulses which have coincided in time. The resulting flow $F_3$ passes through the recalculating unit 7 with the recalculating coefficient $k \geq 1$ and is supplied simultaneously to all first inputs of the logic elements 8.1–8.4. The value "1" recorded in one of the cells 9.1–9.4 of the cycled shifts register 9 moves under the action of the pulses which are received by its input from the output of the second generator of randomly coinciding pulses 10, which acts as a displacing pulse flow. As a result, at the outputs of all elements "AND" 8.1–8.4 the flows are formed which pulses which are randomly distributed in time and have equal frequencies of pulses. A variable component of an average statistic frequency of pulses at the output of any of the logic elements 8.1–8.4 is a value which is a function of an absolute value of a derivative of pulse flow of information $F(\tau)$ which is being read from the source 1 of the receiving device. Under the action of the pulse supplied from the output of the logic element 8.1, the executing unit 11.1 turns the scanning elements of the transmitting and receiving devices into a mode of monotonous reduction in time of the abscissa $X^{(31)}$ in the latter. Under the action of the pulse which is supplied from the output of the logic element 8.3, the executing device 11.3 turns the scanning elements of the transmitting and receiving devices into a mode of monotonous increase in time of the abscissa $X^{(30)}$ of the latter. Under the action of the pulse supplied from the logic element 8.2 the executing unit 11.2 turns the scanning elements into a mode of monotonous reduction of the ordinate $Y^{(31)}$. Under the action of the pulse supplied from the logic element 8.4 the executing unit 11.4 turns scanning elements into a mode of monotonous increase of the ordinate $Y^{(30)}$.

During a transfer from one mode of scanning to an opposite one along an axis of abscissa, the mode of scanning along the axis of ordinates is not changed, and vice versa. With the aid of the comparing element 15.1 a value of actual abscissa of the scanning elements x which is supplied from the generator 12.1 is continuously compared with a given constant value $X_{min}$ which is supplied from the sender 16.1. Similarly the element 15.2 compares the constant value $X_{max}$ supplied from the sender 16.2 with a variable value of abscissa X of the scanning elements supplied from the generator 12.1. When a signal of equal values is produced, the output of the comparing element 15.2 sends a pulse to a second input of the logic element "OR" 19. The pulse from the output of any comparing element 15.1 and 15.2, through the logic element "OR" 19 is supplied to the first input of the logic element "OR" 21 and to the controlling input of the first normally open switch 20.1. A signal from the output of the latter is supplied to the modulating unit 4 formed for example as a modulating electrode of the kinescope, turns off the action of the reproducing unit for example locks the electron beam of the kinescope of the receiving device, and simultaneously the pulse from the output of the logic element "OR" 19 which is supplied to the controlling input of the normally switch 20.1 turns the latter during the time of action of the controlling pulse into the closed condition. In the closed condition the switch 20.1 connects the output of the auxiliary generator 23.1 with the output of the generator of horizontal scanning 12.1. As a result of this connection the output value of the generator 23.1 is transferred to the generator 12.1. After the end of the action of the pulse which is supplied from the output of the logic element 19 the switch 20.1 returns to an open condition from a new starting value $X_i(\tau_i)$, wherein $X_{min} \leq X_i(\tau_i) \leq X_{max\ and\ i} = 1, 2, 3, \ldots$ Since the moment of time $t_i$ of the supply of the pulse from the output of the logic element 19 is random, the value $Xi(\tau_i)$ is random value from the interval $X_{min}-X_{max}$.

When a value of ordinate Y of scanning elements becomes equal to one of the values $Y_{min}$ and $Y_{max}$ a pulse is produced at the output of the comparing element 17.1 or 17.2. Through the logic elements "OR" 22 and 21 it is supplied to the input of the modulating unit 4. The pulse from the comparing elements 17.7 and 17.2 is supplied through the logic element "OR" 22 to the controlling input of the second normally open switch 20.2 and turns the latter during the time of action of the pulse, into the closed condition. In the closed condition the switch 02.2 connects the input of the auxiliary generator 23.2 with the inputs of the generator of vertical scanning 12.2. As a result of this connection the output value of the generator 23.2 is supplied to the generator 12.2 after the end of the acruon of the pulse supplied from the logic element 22 the switch 20.2 returns to its open condition, and the scanning of the generator $12.2 \leq Y_r(\tau_i)$ is random value from the interval $Y_{min}-Y_{max}$. Simultaneously with the end of action of the pulses from the outputs of the logic elements 19 and 22, an input or closing signal is supplied from the modulating unit 4, and the function of the turning (scanning) element in the receiving device for reproducing of the received image is restored.

Therefore, in the first mode of operation of the system, with the open switch 24, when the scanning element reaches the left or right limit of the scanning field, the abscissa of the scanning element jumps from $X_{min}$ or $X_{max}$ with equal probability. The changes in the abscissa of the scanning elements do not lead to changes in ordinates of the latter. Analogous process takes place when the scanning elements reach the upper and lower limits of the scanning field. The ordinate of the scanning elements jump from the values $Y_{min}$ and $Y_{max}$ to obtain a random value $'Y_r(\tau_r)$. All values $Y_r(\tau_r)$ are distributed with an equal probability in the interval $Y_{min}-Y_{max}$.

As can be seen from FIG. 1, a generator of randomly distributed in time pulses 25 is connected with a logic element "OR" 27 which is located between the logic element "OR" 19 and the switch 20.1. On the other hand, a random generator 26 is connected with a logic element "OR" 28, which is connected between the logic element "OR" 22 and the switch 20.2. The random generators 25 and 26 introduce an additional independent flow of impulses which are randomly distributed in time, in addition to the main flow of impulses corresponding to the data which has been interrogated by the interrogating element. Therefore, the interrogating element is moved or jumps back into the field not only when it is deviated by the limit of the field, but also in response to impulses of the additional flow of randomly distributed in time pulses introduced by the random generators 25 and 26, or in other words it can jump back into the field at any point of the field not necessarily at the point of the field limit. As a result, random scannings of samplings from a general multiplicity of elements of the image become shorter, their number becomes greater, and the authenticity of reproduction of the whole image becomes better. In this process the natural quality of a human being to synthesize a whole image from its individual parts contribute to the improvement of the efficiency of the inventive method and system.

Figure 2:
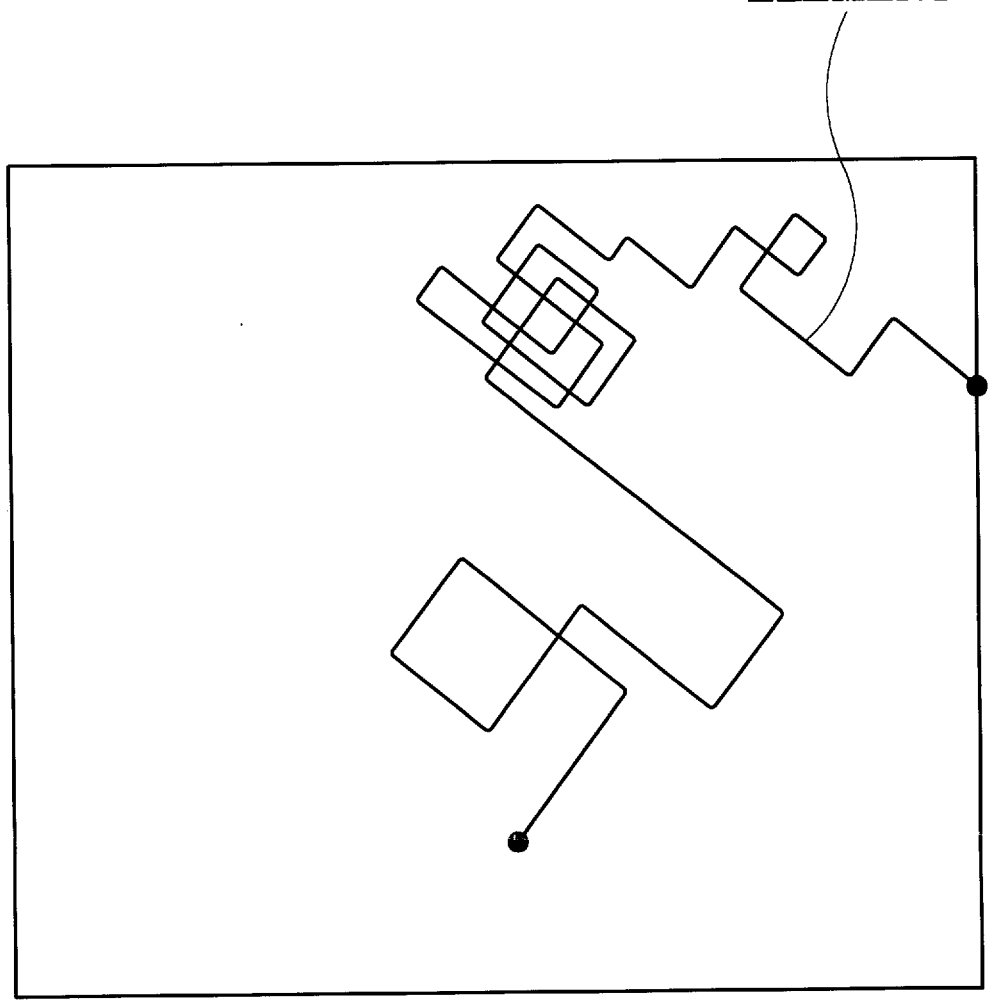
FIG. 2 is a view schematically showing the movements of an interrogating element of the system in accordance with the present invention.
Figure 3:
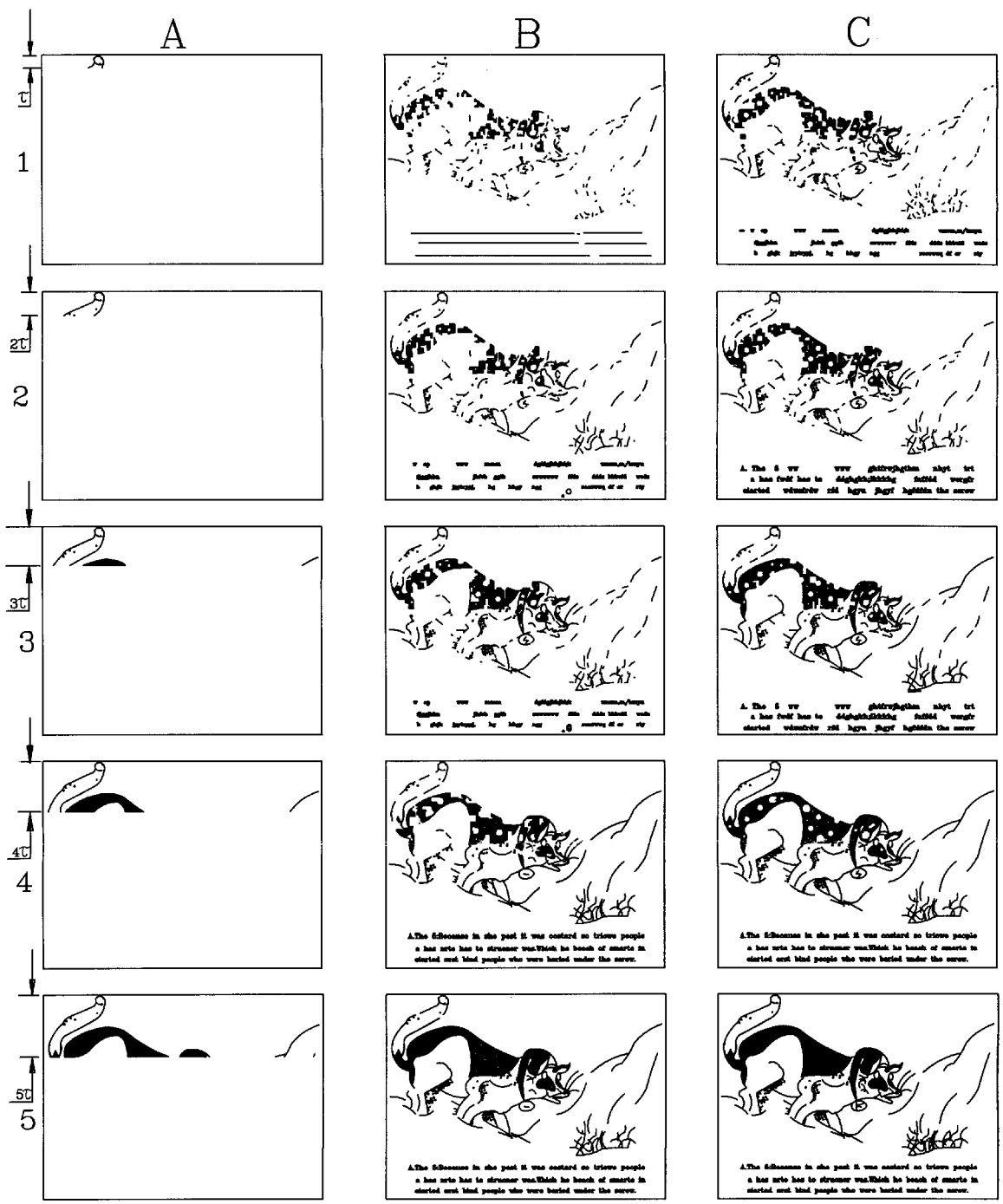
FIG. 3 is a view schematically showing information data presented in accordance with a known method of scanning along the lines and between the lines, the method disclosed in my U.S. Pat. No. 4,945,421, and the method in accordance with the present invention.

This is illustrated in FIG. 2 in which in the column A scanning of portions with the well known line-scanning is shown over equal time intervals $\tau$. Column B shows scanning in accordance with the method disclosed in the U.S. Pat. No. 4,945,421 within the time intervals. Column C shows scanning in accordance with the new inventive method and system within the same time intervals. With the increase of the time of scanning, the size of image is increased in the known line-scanning method of column A, while in contrast in the methods and systems shown in FIGS. B and C the whole image is scanned immediately and its concretization is increased with the passage of corresponding time intervals. In the new inventive method the quality of image reproduction is substantially improved when compared with the method disclosed in the U.S. Pat. No. 4,945,421.

It will be understood that each of the elements described above, or two or more together, may also find a useful application in other types of constructions and methods differing from the types described above.

While the invention has been illustrated and described as embodied in method and system for representing information data with interrogating element displacing from limit information field back into the information field, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of representing information data, comprising the steps of scanning information data; interrogating information data by movable interrogating element; forming a main flow of impulses corresponding to the data which have been interrogated by said interrogating element; introducing into the main flow of impulses a flow of impulses randomly distributed in time so as to produce a flow of further impulses; turning the interrogating element in directions of corresponding coordinates by execution means which receive the flow of the further impulses; providing deviating systems of horizontal and vertical scanning; connecting the execution means with the deviating systems by main scan generator means; connecting additional scan generator means to inputs of the main scan generator means; deviating said interrogating element by additional deviating means from a limit of a field and introducing an additional flow of impulses which are randomly distributed in time by additional random generator means, downstream of the additional deviating means so that said interrogating element can move in response to impulses of said additional flow and deviate also randomly at any point of the field.

2. A system for representing information data, comprising a scanning device for scanning information data and including means for interrogating the information data and formed as a movable interrogating element; means for forming a main flow of impulses corresponding to the information data which have been interrogated by said interrogating element; random generator means introducing into the main flow of impulses a flow of impulses randomly distributed in time, so as to produce a flow of further impulses; execution means receiving the flow of the further impulses for turning the interrogating element in directions of corresponding coordinates; deviating systems of horizontal and vertical scanning; main scan generating means connecting said execution means with said deviating systems; additional scan generator means connected with inputs of said main scan generator means; additional deviating means providing deviation of said interrogating element by a limit of a field; and additional random generator means located downstream of said additional deviation means for introducing an additional flow of impulses randomly distributed in time, so that said interrogating element can move in response to impulses of said additional flow and deviate also randomly at any point of the field.

* * * * *